Patented Feb. 13, 1934

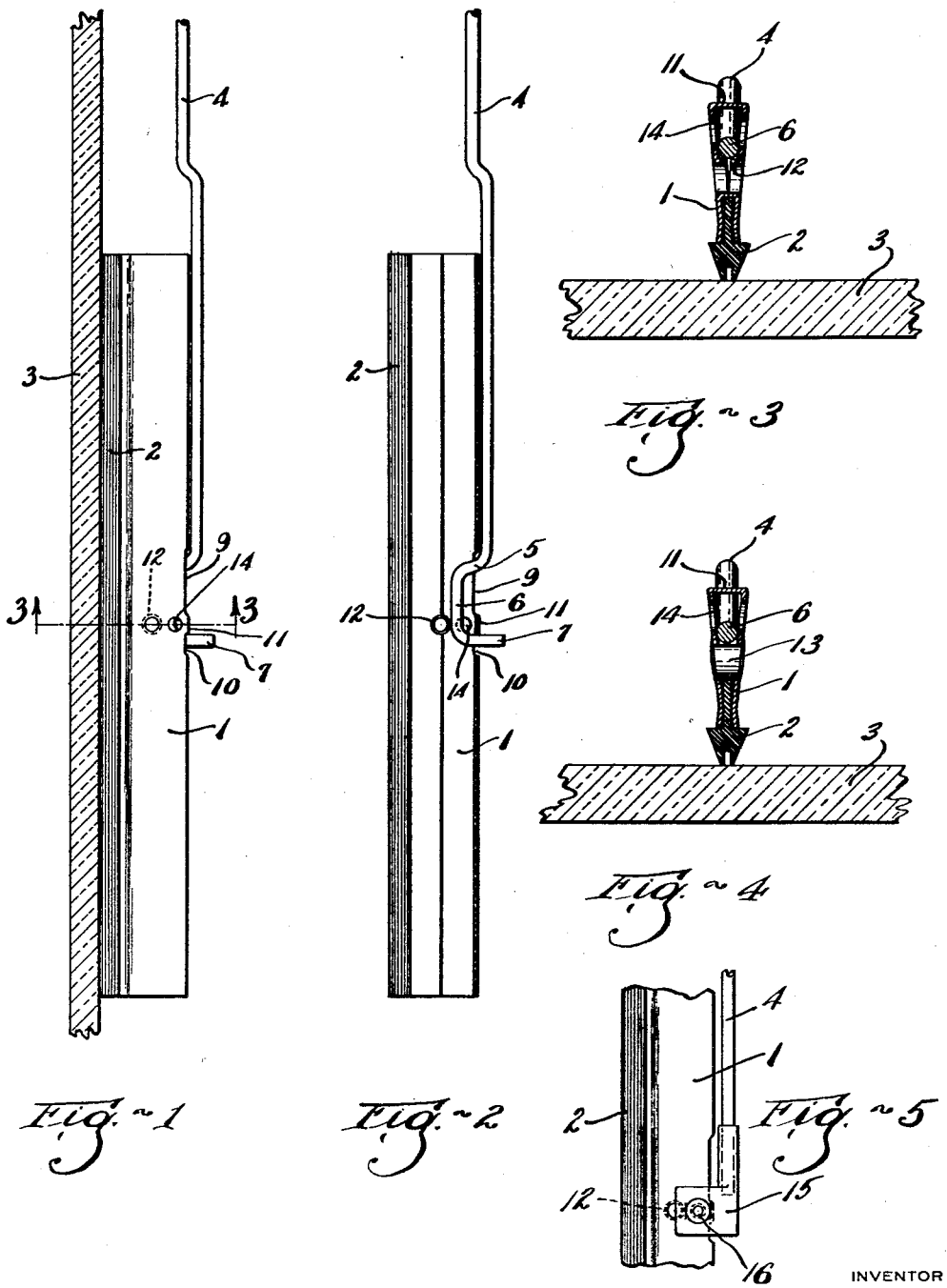

1,947,185

UNITED STATES PATENT OFFICE 1,947,185

WINDSHIELD WIPER BLADE

Frank Browett, Cleveland, Ohio

Application December 26, 1931
Serial No. 583,186

2 Claims. (Cl. 15—250)

My invention relates to a windshield wiper and, particularly, to the blade and the means for attaching such blade to an actuating arm.

Heretofore, windshield wiper blades have usually been provided with clips or the like for providing means for attaching the blades to the wiper actuating arms, and it is one object of my invention to provide a blade that may be directly attached to an actuating arm without the use of such a clip or the like.

Various other objects and advantageous features of my invention will be seen in the following description thereof and one embodiment thereof may be seen in the accompanying drawing wherein similar characters of reference designate corresponding parts, and wherein:

Fig. 1 is an elevation showing a windshield wiper blade constructed in accordance with my invention; Fig. 2 is a longitudinal sectional view thereof; Fig. 3 is a cross sectional view taken on the line 3—3 of Fig. 1; Fig. 4 is a sectional view similar to Fig. 3 but showing a modified form of bearing support for the actuating arm; and Fig. 5 is a fragmentary side elevation of a windshield blade constructed in accordance with my invention with the actuating arm therefor attached thereto by one well known form of clip.

In the drawing, I have shown a windshield wiper blade which includes a suitable holder 1, preferably formed of a strip of sheet metal or the like, bent in substantially U-shape as shown in Figs. 3 and 4 with the legs thereof compressed together to hold therebetween a flexible wiping element 2, said element 2 being of any well known type such as composition or rubber and being adapted to engage a windshield 3 to wipe foreign matter therefrom when the wiper is moved back and forth, as is usual.

An actuating arm 4 is provided for said blade which is adapted to be moved as by a motor or the like and, in accordance with my invention, the actuating arm is adapted to be attached to the blade holder 1 without the use of a clip or the like and is also adapted to be attached in such manner that it has substantially a point bearing contact with the blade holder whereby the wiping element 2 of the blade, through its entire length, will always engage the windshield 3 with equal pressure exerted at both ends of said wiping element.

To accomplish this, the actuating arm 4 has its free end terminating in a generally hook-shaped portion that extends first laterally as at 5 then forwardly as at 6 and then laterally again in the opposite direction as at 7. As shown, said hook-shaped end portion is adapted to be detachably connected to the blade holder 1, and for such purpose, said holder is provided intermediate its ends, in its front wall 11, with a suitable slot 9 and a suitable aperture 10, through which slot and aperture parts 5 and 7 of said actuating arm end portion extend. The part 6 of said actuating arm end portion lies within said holder, in a socket or chamber provided therefor between the wiping element 2 and the holder front wall 11.

Transversely disposed within said socket or chamber between and spaced from the slot 9 and the aperture 10 is a suitable bearing support for the part 6 of the actuating arm end portion, which bearing support, in Figs. 1 to 3 inclusive and in Fig. 5, is shown as a generally tubular boss 12 formed by punching inwardly portions of the holder legs.

The windshield wiper blade of the present application is thus adapted to be firmly but yieldingly held in contact with the windshield 3 by the pressure exerted by the actuating arm 4 on the blade bearing support 12, and the shape and size of such bearing support is preferably such as to provide substantially point bearing contact for said arm end part 6, so that the blade is free to move to enable its wiping element 2 to properly engage, throughout its entire length, the windshield 3 for properly cleaning the same, all as will be readily understood.

Referring to Fig. 4 of the drawing, I have shown a modified form of bearing support 13 in the form of a rivet, bolt, or the like, which has, of course, the same effect as the boss 12.

To make the wiper blade adaptable for attachment to any of the known types of operating arms and attaching means, an opening 14 is provided in the legs of the wiper blade holder adjacent the bearing support thereof. Thus, as shown in Fig. 5, an attachment such as the U clip 15 may be secured to the blade holder as by a bolt or rivet 16 with the actuating arm 4 secured to the U clip and extending therefrom. Of course, any type of clip may be used.

Referring to the drawing and the preceding description, I have provided a windshield wiper embodying a blade adapted for attachment to substantially any type of operating arm but particularly adapted to the usual wire or rod like actuating arm without the use of an attaching clip, the connection being such as to substantially provide a point-like-bearing contact between the actuating arm and the blade holder whereby, regardless of the pressure exerted by the actuating arm to move the wiper blade towards the glass of a windshield, the wiper will always lie parallel to the windshield with equal pressure exerted at both ends of the wiper blade. This is an important feature as will be readily apparent inasmuch as it provides a simple and inexpensive wiper blade that is highly satisfactory in that it leaves no portions of the windshield with which the wiper blade coacts untouched after a wiping action. Various other advantageous features will be readily apparent.

What I claim is:

1. A windshield wiper blade for detachable connection to the generally hook-shaped end portion of an actuating arm, said blade comprising a generally U-shaped holder having arranged between the legs thereof a yielding windshield wiping element, said holder being provided with a socket for detachably receiving the generally hook-shaped end portion of such an actuating arm, whereby said holder is detachably connected with said arm for actuation thereby, and means in said socket for providing a bearing support for said arm end portion, through which bearing support pressure is applied by said arm to said blade for causing the wiping element thereof to yieldingly but firmly engage the windshield to be wiped, said means being of such size and shape that said arm end portion has substantially point contact with said bearing support.

2. A windshield wiper blade for detachable connection to the generally hook-shaped end portion of an actuating arm, said blade comprising a generally U-shaped holder having arranged between the legs thereof a yielding windshield wiping element, said holder being provided with a socket for detachably receiving the generally hook-shaped end portion of such an actuating arm, whereby said holder is detachably connected with said arm for actuation thereby, and a pin-like member supported by the legs of said holder and extending transversely through the socket thereof for providing a bearing support for said arm end portion, through which bearing support pressure is applied by said arm to said blade for causing the wiping element thereof to yieldingly but firmly engage the windshield to be wiped.

FRANK BROWETT.